United States Patent [19]

Sato et al.

[11] Patent Number: 4,589,903
[45] Date of Patent: May 20, 1986

[54] METHOD FOR FERMENTATION OF A STOCKBREEDING WASTE

[75] Inventors: Zenjiro Sato, Tokyo; Kazuyosi Kazama, Higashikurume, both of Japan

[73] Assignees: Zenyuu Ltd., Tokyo; Niisei Kagaku Ltd., Higashikurume, both of Japan

[21] Appl. No.: 788,159

[22] Filed: Oct. 16, 1985

[51] Int. Cl.$^4$ ............................................. C05F 11/08
[52] U.S. Cl. .......................................... 71/9; 423/335
[58] Field of Search ................... 71/9, 21; 423/335; 502/216

[56] References Cited

U.S. PATENT DOCUMENTS 4,486,216 12/1984 von Raven et al. ................. 71/9 X

FOREIGN PATENT DOCUMENTS 0011762 2/1978 Japan ........................................ 71/9
0026794 3/1981 Japan ........................................ 71/9

Primary Examiner—Ferris H. Lander
Attorney, Agent, or Firm—Murray and Whisenhunt

[57] ABSTRACT

A method for fermentation of a stockbreeding waste, especially fowl droppings which comprises mixing the stockbreeding waste, synthesized wollastonite and concentrated sulfuric acid to condense and granulate the mixture, adjusting the resultant granules to pH 6.0-7.85, water content of 65-78.5% and a temperature of 25°-35° C. and spontaneously fermenting the granules at a place not influenced by rainfalls is disclosed. The product obtained by the present method is usable as fertilizer, a soil quality-improving material, a material for seed microorganisms, etc.

5 Claims, 5 Drawing Figures

METHOD FOR FERMENTATION OF A STOCKBREEDING WASTE

BACKGROUND OF THE INVENTION

This invention relates to a method for fermentation of a stockbreeding waste, especially fowl droppings. The product according to the fermentation method is usable as a fertilizer, a soil improver, a medium for fermentation of the stockbreeding wastes etc.

Conventional fermented fowl droppings are produced by admixing sawdust, chaff, etc. with fowl droppings, adjusting water content of the resulting mixture, fermenting a compost pile while the pile is sometimes turned over, and finally drying the pile. The fermented fowl droppings are used as manure, etc. but the effect is not fully satisfactory, because of insufficiency as the culture medium.

On the other hand, there are known granules obtained by mixing synthesized wollastonite and concentrated sulfuric acid to fowl droppings and condensing and granulating the mixture (see Japanese Patent Publication No. 3006/80). The granules are hereinafter referred to as "SK-treated material". Further, the treatment method is referred to as "SK treatment". SK-treated material is free from the bad smell of fowl droppings and is in the dried state, and thus usable as an organic fertilizer containing calcium sulfate and Si.

Synthesized wollastonite used in the present invention is raw material of ceramic products, and has been developed, manufactured and sold by Onoda Cement Co., Ltd., Japan. Its composition, properties, etc. are disclosed in Japanese Patent Publication Nos. 19321/67 and 3246/72. Further, the preparation method of calcium silicate type silica sol and gel obtained by treating synthesized wollastonite with concentrated sulfuric acid, etc. is disclosed in Japanese Patent Publication No. 23764/80. (The calcium silicate type silica sol is denoted as "active silicic acid sol" hereinafter). The synthesized wollastonite is a mixture having the composition shown in the following Table 1.

TABLE 1

| Composition | $SiO_2$ | $Al_2O_3$ | $Fe_2O_3$ | CaO | MgO | $Na_2O$ | $K_2O$ | Total |
|---|---|---|---|---|---|---|---|---|
| Weight % | 53.0 | 2.8 | 0.30 | 43.0 | 0.5 | 0.3 | 0.8 | 100.7 |

The crystal structure of the main components is that of Ca ion combining $Si_3O_9$ wherein three $SiO_4$ tetrahedrous are combined.

Japanese Patent Publication No. 3006/80 discloses that porous condensed granular materials are formed is the SK treated material. Thereafter, the inventors have discovered the following new findings. That is, where the porous condensed granular materials are formed, microorganisms such as a thermophilic microorganism, an acid resistant microorganism, etc., enzymes and organic substances, which survived a severe environment of heat (40°-60° C.) owing to neutralization reaction of synthetic wollastonite with concentrated sulphuric acid, exist as a guest in the porous condensed granular materials as a host. Almost all the infectious microbes, putrefaction-causing microorganisms and pathogenic microorganisms, pests, seeds of weeds, etc. in the fowl droppings have been perished due to heat of neutralization reaction of synthetic wollastonite with conc. $H_2SO_4$. Thus, SK treated material offers suitable environment such as moisture and pH for microorganisms existing in the porous condensed granular materials. Further, parts of starch substance in the fowl droppings have been decomposed and saccharificated by concentrated sulfuric acid and undigested substances in the fowl droppings have also been decomposed, and thus, SK treated material is abundant in nutrients for microorganisms. Furthermore, active silicic acid sol formed in SK-treatment is extremely fine granules and has porous, agglomerated granule having a high surface active property, and thus seems to attribute the selectivity of multiplication and metabolism of microorganisms by inhibiting contamination of infectious microbes. Moreover, the porous agglomerated granules are uniformly dispersed in SK treated material without uneven distribution, and due to their adiabatic property, generation of excess fermentative heat and subsequent carbonization of the organic substances are avoided. That is, fertilizer components which contain nitrogen, phosphoric acid and/or potassium and serve for growth of plants, and other organic substances which microorganisms can metabolize are prevented from carbonization or vanishing. Thus, the SK-treated material is a medium provided with most suitable environment for microorganisms.

Now, a method for fermentation of SK-treated material has been found out to obtain a product usable as excellent fertilizer, soil improver and fermenting medium for stockbreeding wastes.

SUMMARY OF THE INVENTION

Figure 1:
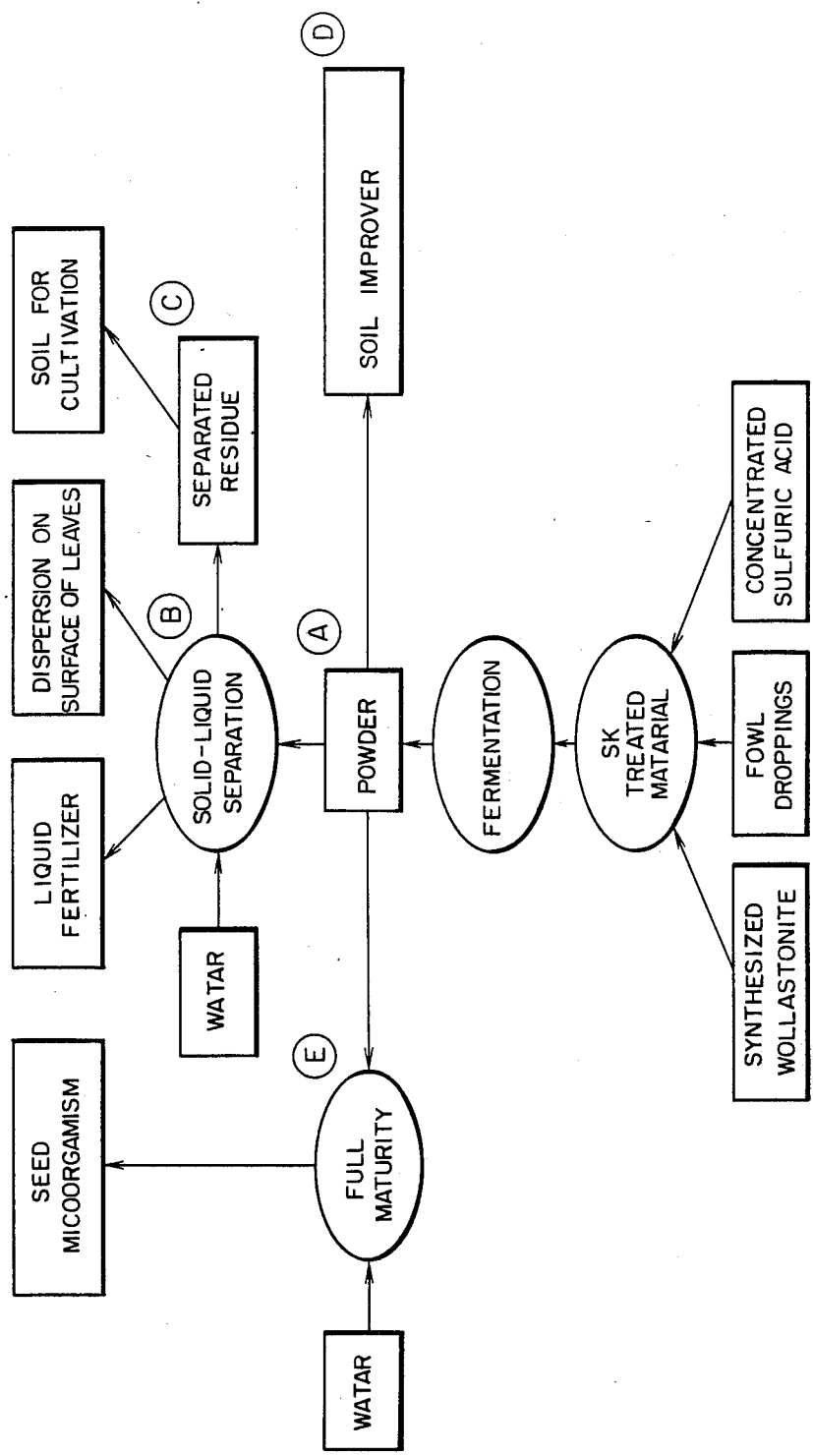
FIG. 1 is a systematic figure showing use of the powder obtained by subjecting SK treated material to the fermentation according to the present invention.

This invention relates to a method for fermentation of a stockbreeding waste which comprises mixing the stockbreeding waste, synthetic wollastonite and concentrated sulfuric acid to condense and granulate the mixture, adjusting the resultant granules to pH 6.0-7.85, water content of 65-78.5% and a temperature of 25°-35° C., and spontaneously fermenting the granules at a place not influenced by rainfalls.

DETAILED DESCRIPTION OF THE INVENTION

The stockbreeding wastes include droppings of domestic animals, especially fowl droppings. Granules obtained by mixing fowl droppings, synthetic wollastonite and concentrated sulfuric acid to condense and granulate the mixture are identical with SK treated material. The preparation of SK treated material is disclosed in the specification of Japanese Patent Publication No. 3006/80 in detail. Generally, SK treated material can be obtained by adding 10–20 weight parts of synthetic wollastonite and 3.6–12 weight parts of concentrated sulfuric acid to 100 weight parts of fowl droppings, and mixing well the mixture with stirring to glanulate the mixture.

Then, SK treated material is adjusted to pH 6.0–7.85, water content of 65–78.5% (w/w) and a temperature of 25°–35° C. The adjustment is necessary for facilitating subsequent spontaneous fermentation and obtaining a suitable fermentative product. The adjustment is made in general by allowing SK treated material to cool for 24–48 hours after SK treatment, while contamination of infectious microbes is minimized. The adjustment can also be made by compulsory cooling or heating, water supplementation, addition of sulfuric acid, synthetic wollastonite, etc. and so on.

Then, spontaneous fermentation commences. Though the spontaneous fermentation may be carried out without piling up the granules after the above adjustment, it is better to carry out the fermentation after piling up thereof from the viewpoint of the increase of fermentation efficiency and operation area. It may also be possible to carry out the adjustment of the pH, water content and temperature after the piling. The spontaneous fermentation should be carried out at a place not influenced by rainfalls. When the spontaneous fermentation is carried out by pile fermentation, it is preferable to turn over the piled SK treated material occasionally. The number of turning over is determined taking fermentation state, environment temperature, etc. into account. For example, when the piled material at the lower part becomes black or smells of ditch, anaerobes are more dominated and thus, turning over is necessary. Further, when the environment temperature is high, number of the turning over should be increased so that the temperature of the central area of the pile may not be increased too high, and when the temperature is low, the number thereof should be decreased to avoid that activity of the microorganisms is lowered. Proper number of the turning over is, in general, once a day to once every three days or every four days.

It is preferable to maintain the temperature of said central area during the spontaneous fermentation at 35° to 75° C. Water content of the granules during the spontaneous fermentation decreases due to fermentation heat, etc. Therefore, when the water content is less than about 30–35%, it is better to maintain the water content in a range of 45–60% by supplementing water thereto, so that the piled material may be matured. Usually, it is unnecessary to regulate pH of the granules during the spontaneous fermentation. Fermentation temperature is lowered with the turning over and increased again with the progress of the fermentation. Though the temperature after the turning over sometimes reaches 60°–75° C. at the begining of the fermentation, the temperature rise is only 2°–5° C. at the later stage of the fermentation, and thus, the fermentation may be finished at the stage. The fermentation time is generally about 25 days to 2 months.

The fermentation progress of the SK-treated material which is adjusted to the temperature of 25°–35° C., water content of 65–78.5% and pH of 6.5–7.85 of the granules at the environment temperature of 15°–30° C. is explained below. The fermentation temperature reaches a peak, i.e. about 70° C. in 1–7 days with the progress of the fermentation, and thereafter the temperature is temporarily lowered. The fermentation of this period is named for convenience the first fermentation stage. Conversion of the substances by multiplication and metabolism of the microorganisms existing in the porous condensed granular material in the SK-treated material is carried out in this stage. Subsequently the fermentation temperature again increases and reaches a peak of about 68° C., and is again lowered. Thus, the fermentation progresses with repeat of increase and decrease of the temperature. Ups and downs of the temperature becomes diminished after about 14 days. The fermentation after 8 days is named the second fermentation stage. In this stage, conversion of the substances by multiplication and metabolism of the coexisting microorganisms in place of the microorganisms whose activity was displayed at the first fermentation stage is carried out. Actinomyces, yeast, etc. can be detected by a microscope. Water content of the SK-treated material is about 50% at the 8th day, and sometimes 20–30% on and after the 8th day. In the latter case, to supplement water thereto is sometimes necessary for the maturity. The SK-treated material at this stage does not become corrupt at all by water supplement. This is also one of the present characteristics.

The powder obtained by the fermentation for about 25 days is brown, dry powder having somewhat sweet, nice smell of soil. Thus, fermentation of the SK-treated material progresses by that the organic substances therein are decomposed by the microorganisms in a short period. Analytical result of the powder is shown in Table 1.

TABLE 1

Components of the powder obtained by fermentation of SK-treated material according to the process of the present invention

| Component | Rate |
|---|---|
| Total nitrogen | 1–4% (dry matter) |
| Total phosphorus | 1–4.5% (dry matter) |
| Potassium | 1–3% (dry matter) |
| Water soluble substances | 30–40% |
| pH | 7.3–7.8 (19° C.) |
| Amino acids in water soluble substances | 20–30% |
| Soil organic acid in water soluble substances | 5–20% |
| Sugars (Brx) | 18–25% |
| Active silicic acid sol in water soluble substances | 50000 ppm or below |
| Water | 35–40% |
| Water insoluble substance | 35–20% |

Note: The percentage is by w/w.

Fertilizing components such as nitrogen, phosphorus and potassium contained in the fowl droppings which are raw material exist as they are. However, there are formed various amino acids, soil organic acids such as levulinic acid, lactic acid, butyric acid, nucleic acid, citric acid, furonic acid, and humic acid during multiplication and metabolism of the microorganisms. In addition, the resulting powder contains 18-25 of sugars (Brx), 50000 ppm or less of active silicic acid sol formed during SK-treatment, calcium silicate and calcium sulfate. The powder Ⓐ obtained by fermenting SK-treated material according to a method of the present invention (see FIG. 1), that is the product of Example 1, is extracted with water of three times the amount of the powder Ⓐ .The physical properties components in the extract are shown in Table 2.

TABLE 2

| Physical properties of components in the extract | |
|---|---|
| Components | Rate |
| Active silicic acid sol | 15,000 ppm or below |
| Sugars (Brix) | 6-8 |
| Surface tension | 50-60 dyn |
| pH | 7.3-7.8 |
| Specific gravity | 1.018 |
| Refractive index | 1.336 |

Figure 2:
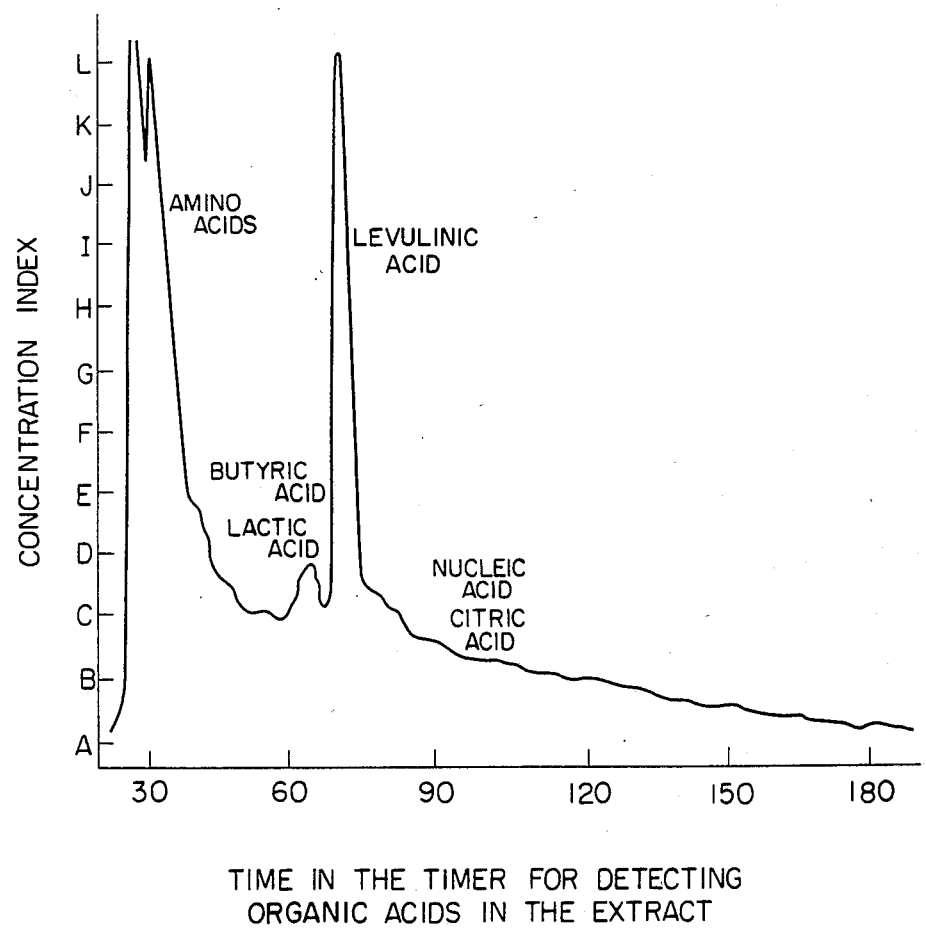
FIG. 2 is a chromatogram for detecting amino acids and soil organic acids in the extract of the powder obtained by subjecting SK treated material to the fermentation according to the present invention. The detection method is based on the method of Noda Shoyu Co., Ltd.
Figure 3:
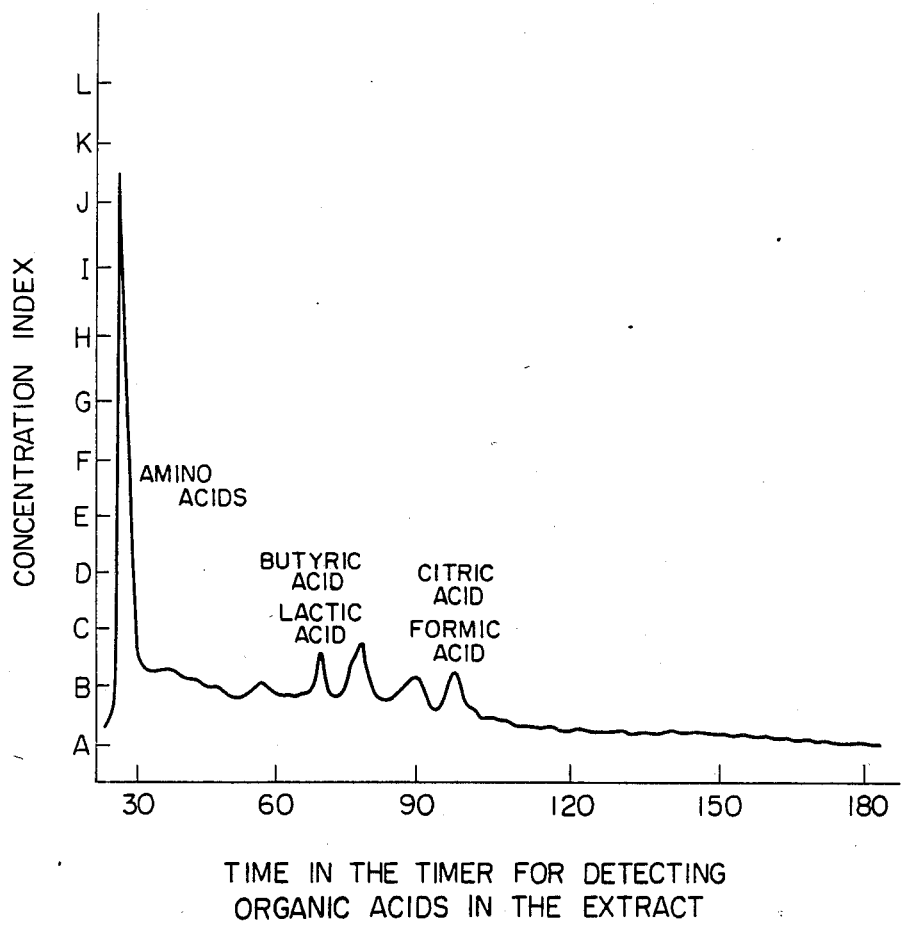
FIG. 3 is a chromatogram for detecting amino acids and soil organic acids in the extract of the powder obtained by subjecting SK treated material to the fermentation according to the compulsory aeration method of Laboratory for Mechanizing Agriculture. The detection method is based on the method of Noda Shoyu Co., Ltd.

The extract contains amino acids and levulinic acid in much amounts, lactic acid, butyric acid, nucleic acid, citric acid, etc., as apparent from chromatography analytical curve (FIG. 2) of amino acids and soil organic acids amounts according to the examination method by Noda Shoyu Co. Ltd. Further, the SK-treated material was fermented according to a method for fermentation with compulsory aeration of a corporation having a special status, Laboratory for Mechanizing Agriculture (the result of the study No. 53-5, referring to the study for mechanization of production of compost). Contents of amino acid and soil organic acid in the extract obtained by extracting the thus obtained product with water are exhibited in chromatographic analytical curve of FIG. 3. It is apparent from FIG. 3 that both amounts of the amino acids and soil organic acids are little. Further, extract of the conventional fermented fowl droppings with water is black liquid due to decomposition of the lignin in the sawdust, bark, etc. added for regulating water content of the fowl droppings and due to an aerobic decomposition of the fowl droppings. Thus, the extract does not contain amino acids and soil organic acids as a result of multiplication and metabolism of the microorganisms and further does not contain active silicic acid sol. On the other hand, extract of the product according to the present invention is abundant in the nutrients necessary for growth of plants and has small surface tension, and will thus serve as liquid fertilizer and for nutrients supplement from surface of leaves. Use of the powder obtained by fermentation of the SK-treated material according to the present invention is demonstrated in FIG. 1. Ⓐ in FIG. 1 is the powder obtained as above described and is usable as a soil improver Ⓓ . The powder Ⓐ is further matured by additional fermentation for 20-35 days while water is supplemented thereto so that the water content may be maintained, for example in a range of 50-55%. Actinomyces and yeasts are multiplicated by the additional fermentation. The product thus obtained is used as seed microorganisms for promoting activation and multiplication of the microorganisms in the SK-treated material. Though use of the extract obtained by adding water to the powder Ⓐ and subjecting the mixture to solid-liquid separation is as above described, the solid cake is usable as soil for cultivation. Results of germination test of a kind of Chinese cabbage, Brassica Rapa var, *peruidis* using the powder Ⓐ or the available fermented fowl droppings powder of which tradename is Minoruyuki are shown in Table 3. It is apparent from the table that the powder Ⓐ is superior in both germination rate and growth degree.

TABLE 3

Comparison in germination test of the powder A obtained by the fermentation of SK treated material according to the present invention with the fermented fowl droppings powder, Minoruyuki

| Name | Section | Examination | Pot No. | June 21, 1982 Germination rate (%) | Germination number | Germination rate (%) | Germination investigation Living body weight (g/pot) | Dry weight (g/pot) | Germination rate | June 24, 1982 Plant height (cm) | Leaflet number | The others General symptoms of damage | Dry weight index | Growth investigation July 1, 1982 Plant height (cm) | Leaflet number |
|---|---|---|---|---|---|---|---|---|---|---|---|---|---|---|---|
| Powder A according to the present invention | Sample | 1 | 1-1 | 92 | 23 | 96 | 6.3 | 0.58 | 24 | 3.5-4.5 | One plant withered | | 121.1 | 6.5-2.0 | 0 |
| | | | 1-2 | 96 | 24 | 96 | 7.6 | 0.74 | 24 | 3-4.5 | | | | 6.0-8.5 | 2 |
| | | | Average | 94 | | 96 | 6.95 | 0.66 | | | | | | | |
| | | 2 | 2-1 | 76 | 19 | 80 | 8.7 | 0.98 | 20 | (1)-4.5 | Two plants withered | | 183.5 | 6.0-9.5 | 2 |
| | | | 2-2 | 36 | 9 | 84 | 7.8 | 1.02 | 21 | (0.5)-4 | Two plants withered | | | 6.0-7.5 | 2 |
| | | | Average | 56 | | 82 | 8.25 | 1.00 | | | | | | | |
| | | 3 | 3-1 | 92 | 23 | 96 | 7.1 | 0.48 | 24 | 3-4.5 | | | 78.0 | 5.5-7.0 | 2 |
| | | | 3-2 | 84 | 21 | 88 | 5.0 | 0.37 | 22 | 2-4.5 | | | | 3.5-6.0 | 2 |
| | | | Average | 88 | | 92 | | | | | | | | | |
| | | 4 | 4-1 | 72 | 23 | 92 | | | 23 | 3-3.5 | One plant withered | | | 3.5-7.0 | 2 |
| | | | 4-2 | 100 | 25 | 100 | | | 25 | 3-3.5 | One plant withered | | | 3.5-5.0 | 2 |
| | | | Average | 76 | | 96 | | | | | | | | | |
| Minoruyuki (Fermented fowl droppings) | Control (1) | 5 | 5-1 | 92 | 23 | 92 | | | 23 | 3-4.5 | One plant withered | | | 4.5-7.5 | 2 |
| | | | 5-2 | 64 | 16 | 68 | | | 17 | (0.5)-4.0 | Four plants withered | | | 3.0-6.5 | 2 |
| | | | Average | 78 | | 80 | | | | | | | | | |
| | | 6 | 6-1 | 56 | 14 | 68 | | | 16 | (1)-4.0 | Three plants withered | | | 2.0-7.0 | 2 |
| | | | 6-2 | 64 | 16 | 64 | | | 17 | (1.5)-4.0 | Three plants withered | | | 2.0-6.0 | 2 |
| | | | Average | 60 | | 66 | | | | | | | | | |
| | | 7 | 7-1 | 44 | 11 | 48 | | | 12 | (1.5)-4.0 | Two plants withered | | | The root withered from the beginning | |
| | | | 7-2 | 24 | 16 | 40 | | | 10 | (0.5)-3.5 | | | | | |
| | | | Average | 34 | | 44 | | | | | | | | | |
| | | 8 | 8-1 | 60 | 15 | 60 | | | 15 | 1-2.3 | One plant withered | | | The root withered from the beginning | |
| | | | 8-2 | 44 | 11 | 44 | | | 11 | 1-2.0 | | | | | |
| | | | Average | 52 | | 52 | | | | | | | | | |
| | Not treated | 9 | 9-1 | 92 | 23 | 96 | | | 24 | 4.5 | Three plants withered | | | 6.0-7.5 | 2 |
| | | | 9-2 | 88 | 22 | 88 | | | 22 | 4.5 | | | | 6.0-7.5 | 2 |
| | | | Average | 90 | | 92 | | | | | | | | | |
| Chemical fertilizer (Nitrogen fertilizer) | Control (2) | 10 | 10-1 | 92 | 23 | 92 | | | 23 | 2-3.5 | One plant withered | | | The root started to wither | |
| | | | 10-2 | 92 | 23 | 92 | | | 23 | 2-3.5 | One plant withered Three plants fall | | | | |
| | | | Average | 92 | | 92 | | | | | | | | | |

| Name | Section | Examination | Pot No. | Growth investigation July 13, 1982 Plant height (cm) | Leaflet number | Soil after the germination test pH | Electric conductivity (1:5) Ms/cm | Note |
|---|---|---|---|---|---|---|---|---|
| Powder A according to the present invention | Sample | 1 | 1-1 | 7.5-12.0 | 3 | 5.75 | 0.398 | |
| | | | 1-2 | 7.0-11.0 | 3(4) | 5.70 | 0.384 | |
| | | | Average | | | | | |
| | | 2 | 2-1 | 7.0-12.0 | 3(4) | 5.725 | 0.391 | |
| | | | 2-2 | 7.5-12.0 | 3-4 | 5.75 | 0.677 | |
| | | | Average | | | | | |
| | | 3 | 3-1 | 7.0-12.0 | 3-4 | 5.50 | 0.728 | |
| | | | 3-2 | 5.5-8.0 | 3(4) | 5.625 | 0.703 | |
| | | | | | | 5.50 | 1.00 | |
| | | | | | | 5.50 | 1.06 | |

TABLE 3-continued

Comparison in germination test of the powder A obtained by the fermentation of SK treated material according to the present invention with the fermented fowl droppings powder, Minoruyuki

| | | | | | | | | |
|---|---|---|---|---|---|---|---|---|
| | | 4 | Average | | 6.05 | 0.425 | | 5.50 | 1.03 |
| | | | 4-1 | 4.5–14.0 | 3(2) | 3.3 | 0.24 | 38.5 | Growth rates were | 5.60 | 1.56 |
| | | | 4-2 | 3.5–7.0 | 2(3) | 2.2 | 0.18 | | considerably | 5.65 | 1.66 |
| | | | Average | | | 2.75 | 0.21 | | different | 5.65 | 1.66 |
| Minoruyuki (Fermented fowl droppings) | Control (1) | 5 | | | | | | | The root withered | | |
| | | | 5-1 | 8.0–13.0 | 3(4) | 7.0 | 0.61 | 10.0 | The root of one | 6.00 | 0.384 |
| | | | 5-2 | 6.0–11.0 | 4(3) | 5.3 | 0.48 | | plant withered | 6.00 | 0.334 |
| | | | Average | | | 6.13 | 0.545 | | | 6.00 | 0.359 |
| | | 6 | 6-1 | 3.0–11.0 | 3(4) | 3.8 | 0.30 | 54.1 | The root of one plant withered | 6.30 | 0.391 |
| | | | 6-2 | 2.5–8.0 | 3 | 3.2 | 0.29 | | The root of two | 6.25 | 0.547 |
| | | | Average | | | 3.5 | 0.295 | | plants withered | 6.275 | 0.469 |
| | | 7 | 7-1 | | | | | | Growth rates were different | 4.85 | 0.663 |
| | | | 7-2 | | | | | | | 5.30 | 0.575 |
| | | | Average | | | | | | | 5.075 | 0.619 |
| | | 8 | 8-1 | | | | | 0 | | 4.80 | 0.816 |
| | | | 8-2 | | | | | | | 4.55 | 0.806 |
| | | | Average | | | | | | | 4.675 | 0.811 |
| | Not treated | 9 | 9-1 | 8.0–11.0 | 3(4) | 7.7 | 0.65 | 113.8 | Damages were most | 4.75 | 0.148 |
| | | | 9-2 | 8.0–11.5 | 3(4) | 7.4 | 0.59 | | little and the root | 4.35 | 0.155 |
| | | | Average | | | 7.55 | 0.62 | | and stem are stout | 4.55 | 0.152 |
| Chemical fertilizer (Nitrogen fertilizer) | Control (2) | 10 | 10-1 | | | | | 0 | | 5.35 | 0.534 |
| | | | 10-2 | | | | | | | 4.65 | 0.414 |
| | | | Average | | | | | | | 5.00 | 0.474 |

EXAMPLE 1

Raw fowl droppings having water content of 85% and after excretion of which more than one week does not lapse were subjected to SK treatment and the resulting SK-treated material was fermented.

The apparatus for agitation used for SK treatment has capacity of 50 kg and is equipped with one fan of 90 r.p.m. and 90 m/min. of circuit speed. As fowl droppings have high viscosity and it is difficult to uniformly mix them with additives, special contrivance on shape of the fan is made.

At first, 25 kg of raw fowl droppings having water content of 90% was charged in the apparatus for agitation, and 1.5 kg of concentrated sulfuric acid (6% based on the raw fowl droppings) and 2.5 kg of synthetic wollastonite (10% based on the raw fowl droppings) were added thereto. The mixture was agitated for about 20 minutes, taken out from the apparatus and allowed to cool. The treatment was repeated 40 times to obtain one ton of the treated material as a whole.

When water content of raw fowl droppings is 95% or more, it is preferable to use concentrated sulfuric acid and synthetic wollastonite in excess amount of 1–2%. Further, when raw fowl droppings which are rotten and have pH of 8–9 due to long time lapse after the excretion are used, it is preferable to increase amount of concentrated sulfuric acid to be used by 1–2 volume parts. When too dried raw fowl droppings are used, it is better to adjust the water content of around 80% by water supplement. In any cases, raw fowl droppings and concentrated sulfuric acid are agitated in the apparatus for agitation to be a pH of 1–2, and the mixture after addition of synthetic wollastonite is agitated to be a pH of 4–4.5. The temperature of neutralization reaction was 40°–60° C. After the agitation, the SK-treated material was taken out and allowed to cool for 24–48 hours, whereby the material was just adjusted to conditions for starting the fermentation, i.e., water content of 78.5%, pH 7.72, a temperature of 25° C.

Figure 4:
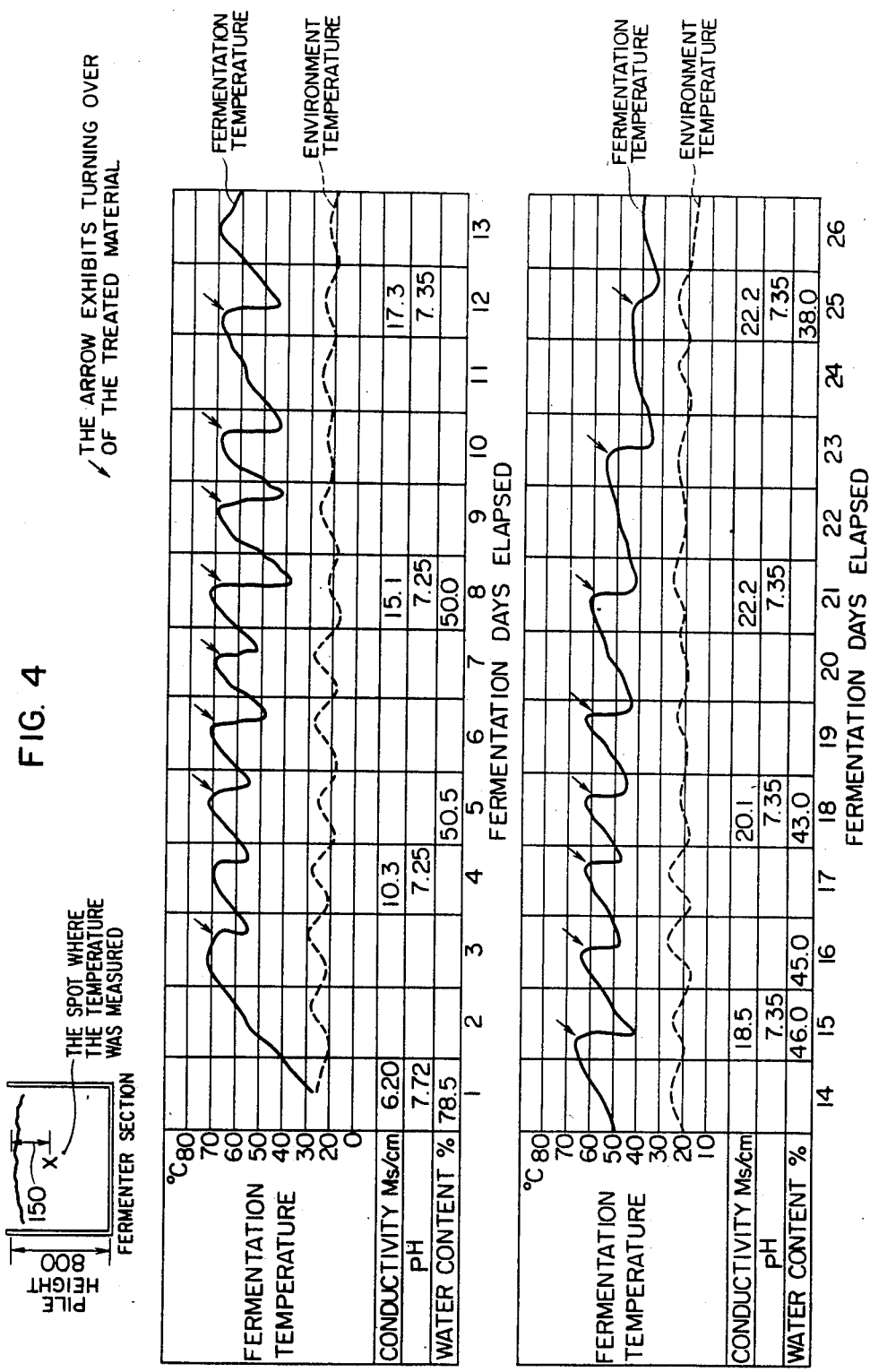
FIG. 4 is a curve and numerical table showing the relation between fermentation days elapsed and property changes of the treated material in Example 1.

Thus obtained and adjusted one ton of the SK-treated material was piled at a height of about 80 cm in a fermenter having a width of 1 m, a length of 6 m and a section exhibited in FIG. 4 and was fermented. Both sides of the fermenter were made of slate plates with foamed styrol for preventing radiant heat. The turning over of the piled material between the upper part and the lower part was conducted every day for preventing that fermentation of the piled material is displaced to either anaerobic or aerobic fermentation. Fermentation temperature was measured at around center of the fermenter as shown in FIG. 4.

Temperature of the first fermentation stage rises to 70° C. as a peak temperature, and drops by about 15°–25°C. by the turning over and again rises. Such a procedure is repeated, and at the 7th day after start of the fermentation temperature drop after the turning over exceeds 30° C. and the temperature of the piled material is 40° C. or less, and then the temperature again rises. Then, the second fermentation stage proceeds while repeating the difference between the peak temperature and the lowest temperature of 20°–25 C., and then gradually lowering the peak temperature and reducing the temperature difference.

Properties of the piled material were the conductivity of 6.20 ms/cm, the pH of 7.72 the water content of 78.5% and the temperature of 25° C. at the initial of the fermentation, and were the conductivity of 14 ms/cm, the pH of 7.25, the water content of 50% and the temperature of 50°–70° C. at the 8th day when the first fermentation stage was complete with almost fulfilment of the fermentative conditions. Properties of the piled material were the conductivity of 18.5 ms/cm, the pH of 7.35, the water content of 46.0% and the temperature of 40°–65° C. at the 15th day, a middle point of the second stage, and were the conductivity of 22.0 ms/cm, the pH of 7.35, the water content of 38.0% and the temperature of 40° C. at the end of the fermentation.

Yield of the powder having the water content of 40% obtained from 100 parts of raw fowl droppings having the water content of 80–90% was 60 parts. The powder having the water content of 40% does not rot. This is one of the characteristics of the present process.

EXAMPLE 2

Figure 5:
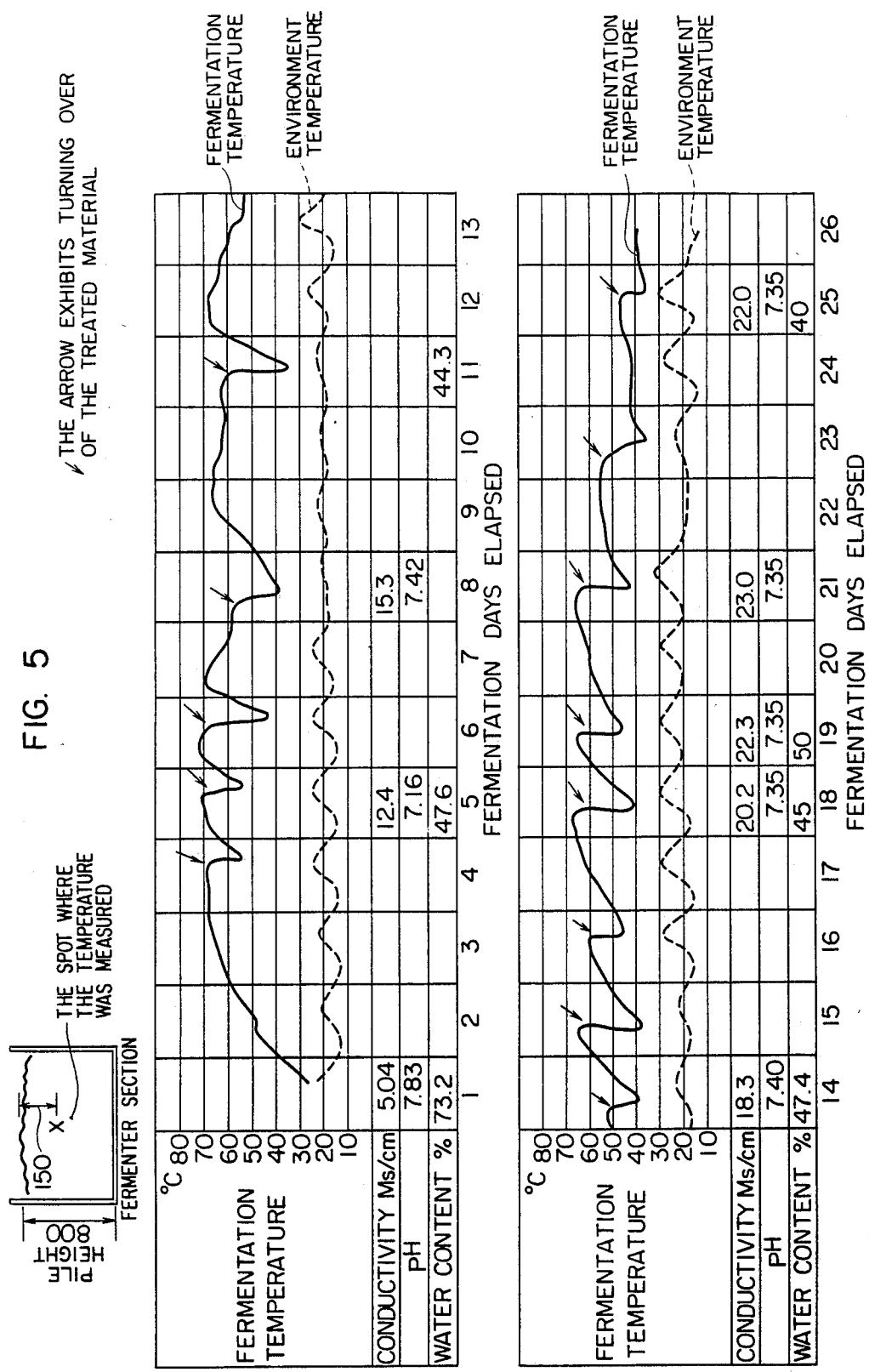
FIG. 5 is a curve and numerical table showing the relation between fermentation days elapsed and property changes of the treated material in Example 2.

Raw fowl droppings having the water content of 85% as is the case in Example 1 and the same apparatus for agitation that was used in Example 1 were used. At first 25 kg portions of the raw fowl droppings were subjected to SK treatment. The treatment was repeated 40 times to obtain one ton of the SK-treated material. The material was fermented in the same manner as described in Example 1. The fermentation temperature was measured at the center of the fermenter as shown in FIG. 5 as is the case in Example 1. However, in the present example, the turning over was not carried out every day but carried out at a prolonged interval of time in order to make clear how conversion of the substances proceeds. As is the case in Example 1, temperature of the first fermentation stage rises up to 70° C., a peak temperature, and drops by about 15°–25° C. by the turning over and again rises. Such procedure is repeated. At the stage when the turning over was not carried out, rise and fall of the temperature was small but the fermentation proceeded. Properties of the powder obtained by the fermentation for 25 days were the conductivity of 22.0 ms/cm, the pH of 7.35, the water content of 40% and the temperature of 40° C.

It is not considered from a comparison of the results of Examples 1 and 2 that the difference in intervals of the turning over causes large difference in fermentation term and change in properties of the piled material. It has been made clear that the fermentation process without large scatter in the property change only by controling the preliminary stage for the fermentation, that is by adjusting the mixing ratio of raw fowl droppings, concentrated sulfuric acid and synthetic wollastonite to a predetermined proper ratio and by mixing them uniformly. Thus it has been found that quality control during the fermentation is easily done in general and uniform powder can be produced.

What is claimed is:

1. A method for fermentation of a stockbreeding waste which comprises mixing the stockbreeding waste, synthetic wollastonite and concentrated sulfuric acid to condense and granulate the mixture, adjusting the resulting granules to pH 6.0–7.85, water content of 65–78.5% and a temperature of 25°–35° C. and spontaneously fermenting the granules at a place not influenced by rainfalls.

2. A method according to claim 1 wherein said stockbreeding waste is fowl droppings.

3. A method according to claim 1 wherein said granules are piled after adjusting the pH, water content and temperature or first piled and then adjusting the pH, water content and temperature, and the fermentation is carried out while the piled granules are sometimes turned over.

4. A method according to claim 3 wherein the fermentation is carried out while the temperature at the center of the piled granules is maintained to 35°–75° C.

5. A method according to claim 1 wherein the fermentation is carried out while water content of the granules is maintained to 35–45%, if necessary by water supplementation.

* * * * *